3,323,878
METHOD FOR PREPARING BORON COMPOUNDS
Frank C. Gunderloy, Jr., Menlo Park, N.J., assignor to Esso Research and Engineering Company, a corporation of Delaware
No Drawing. Filed Nov. 25, 1959, Ser. No. 855,468
7 Claims. (Cl. 23—358)

This is a continuation-in-part of U.S. patent application Ser. No. 820,823, filed June 15, 1959, now abandoned.

The present invention relates to the preparation of a hydrazine compound. Specifically, it concerns making hydrazine diborane, also known as hydrazine bis-borane, which is useful as a fuel, especially in rockets which employ monopropellant systems. In particular, it relates to a novel method for preparing hydrazine diborane by reacting ionic hydrazine compounds with borohydrides, preferably in a cyclic ether diluent.

A great deal of research work has been undertaken in recent years to find suitable monopropellants that are capable of propelling rocket devices. Solid monopropellants that are stable at ambient temperatures are highly desirable as motors in "pure" rockets, i.e. thrust producers which do not use the surrounding atmosphere, because they can be stored for long periods of time and are ready for immediate use. The term "monopropellant" as used herein means a substance which does not need any other substance to bring about the release of its thermochemical energy.

An object of this invention is to provide a process for the preparation of stable hydrazine diborane. Another object is to provide a simple method for isolating and recovering hydrazine diborane from the other substances in the reaction mixture.

It has now been discovered that hydrazine diborane can be satisfactorily prepared by reacting ionic hydrazine compounds with ionic borohydrides in the absence of diethyl ether. It was found that diethyl ether causes the reaction product to decompose at ambient temperatures and thus its presence in the reaction mixture is undesirable. The hydrazine diborane prepared in accordance with the process, to be described hereinafter, is a stable high energy chemical that can be combusted in the absence of other substances, such as oxygen.

Preferably, the process is carried out by contacting an ionic inorganic or organic hydrazine compound with a metal borohydride under reaction conditions, that is to say, in the liquid phase between about $-80°$ C. and the melting point of the reaction product. The hydrazine reactant is a compound which contains a diprotic hydrazinium ion ($N_2H_6^{++}$) whose primary valence is ionically bonded to a negative ion or anion. Hydrazine reactants coming within the purview of this invention have the formula:

$$S_x(N_2H_6^{++})_m$$

wherein "S" is one or more organic or inorganic anions; "H" and "N" are hydrogen and nitrogen, respectively; "$x$" is an integer of 1 to 2 and is the number of anions needed to balance the formula, i.e. it is 1 when "S" is a divalent anion and 2 when "S" is monovalent; and "$m$" is an integer of 1 to 3 which is equal to one-half of the valence of anion "S." If the anion is monovalent, e.g. bromide, then "$x$" is 2 and "$m$" is 1; if it is divalent, e.g. sulfate, then "$x$" is 1 and "$m$" is 1. The anion "S" is generally a nonmetallic ion, such as acetate, formate, carbamate, phosphite, phosphate, azide, nitrite, nitrate, sulfate, chlorate, perchlorate, butyrate, laurate, oxalate, glutarate, cyanate, thiocyanate and halide, e.g. chloride and bromide. The organic anions may be mono- or poly-carboxylic acid radicals having 1 to 16 carbon atoms. The lower molecular weight, e.g. $C_1$ to $C_4$, saturated acids are preferred. Examples of specific hydrazine compounds coming within the scope of the above formula are: hydrazine dihydrochloride, hydrazine diacetate, hydrazine diformate, hydrazine diphosphate, hydrazine dinitrate, hydrazine dichlorate, hydrazine diperchlorate, hydrazine dicyanate, hydrazine dihydrobromide and hydrazine sulfate.

The borohydride reactant may be any stable salt, such as a metal borohydride or a nitrogen-containing borohydride. The preferred inorganic metal borohydrides are the alkali metal borohydrides, such as sodium, lithium or potassium borohydride. Other metal borohydrides, such as aluminum or the alkaline earth metals, e.g. calcium and magnesium, can be used. Quaternary ammonium salts, such as the tetraalkyl ammonium borohydrides, e.g. tetraethyl or tetramethyl ammonium borohydride, are also satisfactory. The preferred reactants are sodium borohydride and hydrazine sulfate or hydrazine dibromide because of the high yields they produce within a relatively short time.

Since the reactants are generally solids, it is desirable to employ an inert liquid diluent to facilitate handling the reactants and afford better contact in the reaction zone. It is sometimes advantageous to admix one or both reactants with diluent before introducing them to the reaction zone where they are intimately contacted by means of an efficient stirring device. The diluent should not contain any functional groups which react either with the reactants or the desired product, except of course where it promotes the reaction in some manner. Among the common inert organic and inorganic diluents that may be used are $C_5$ to $C_{10}$ hydrocarbons such as benzene, heptane, nonane and hexane, halides such as carbon tetrachloride, chloroform and perfluoropentane, acids such as acetic acid, esters, such as ethyl acetate, amides such as dimethyl formamide, acetals such as methylal, and nitriles such as acetonitrile. Carbonyl compounds, i.e. aldehydes and ketones, and alcohols are usually not satisfactory diluents. The preferred diluents are 5 or 6 member heterocyclic ethers, such as tetrahydrofuran, dihydropyran and dioxan, because they are solvents for the hydrazine diborane product. These solvents facilitate the separation of the product from the reaction mixture because the nongaseous by-products are often insoluble in these ethers. Thus, by using organic cyclic ethers, separation can be accomplished by filtration and evaporation of the solvent. Moreover, in a continuous process, the cyclic ether can be continuously removed from the reaction zone, flashed or distilled from the product and recycled to the reactor. The amount of diluent used in the reaction mixture is not critical. Of course, a substantial quantity, e.g. 50 to 99.5 wt. percent, should be present in the reaction zone to permit easy handling of the reactants. Where the diluent is not a selective solvent for the product, separation may be achieved by distilling or filtering off the diluent and recovering the hydrazine boranes from the residue by sublimation. Any other separation techniques known in the art may also be employed, such as selective extraction and evaporation of the solvent.

The reaction conditions are not critical, and therefore, the temperatures and pressures employed are governed by the economics of the particular process. Ambient temperatures and atmospheric pressure are suitable conditions for carrying out the reaction. However, temperatures in the range of 0 to 30 or 45° C. and pressures between about 10 mm. and 1 atmosphere or slightly higher have been found to be quite satisfactory. Care must be taken at the higher temperatures to avoid degradation of the desired reaction product. Thus while higher temperatures reduce reaction time, they are usually accompanied by other things which may be more injurious than the benefits derived by their use. At room temperature or lower the reaction is generally carried out for a period ranging up to about 10 days, e.g. several hours to 5 days. The reaction commences almost immediately upon contacting the reactants as is evidenced by the evolution of hydrogen from the reaction mixture. The hydrogen may be recovered and used in other chemical processes such as the hydrogenation of aldehydes to form alcohols.

The atmosphere in the reaction zone must be inert in order to avoid product degradation. Inert gases, such as nitrogen, helium and argon, may be employed to flush out the reactor at the beginning of the run. Thereafter these gases may be circulated through the reactor to remove any hydrogen formed therein during the reaction.

It is important to avoid contamination of the components in reaction mixture with ethyl ether since this substance has a deleterious effect on the hydrazine boranes made by this process. Moreover, this ether should not be used to purify the product because it will degrade it and render it useless as a high energy monopropellant. It is usually advisable to carry out the process in the absence of acyclic ethers.

The hydrazine diborane prepared in accordance with the process described herein is highly stable at room temperature (25° C.) and is only slightly sensitive to impact or friction. It has the empirical formula $B_2N_2H_{10}$ and is believed to have the following structure:

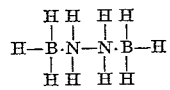

in which there are coordinate bonds between the nitrogen and boron atoms. The product is amorphous when crystallized from the aforementioned ethers and has no detectable melting point up to 260° C. It has a specific impulse of 286 sec.$^{-1}$, and when admixed with fuels, such as boron or aluminum, higher specific impulses are obtained.

The hydrazine diborane prepared in accordance with the present invention can be compounded with conventional materials used in solid rocket propellant systems, such as binders or adhesive substances. Because this monopropellant possesses an unusually low flame temperature, 1500 to 2000° K., it is especially suited for use in end burning rockets. End burning grains allow a more efficient use of the rocket case's volume and impose fewer mechanical (structural) limitations on the propellant. It is also useful as a coolant in rocket propellant mixtures which normally burn at high temperatures. If desired, an oxidizing agent, such as fluorine, can be included in the propellant mixture to change the combustion characteristics of the borane. The diborane may also be used in many chemical reactions as a reducing agent, e.g. in the preparation of oximes.

The following examples show how hydrazine diborane is prepared from various hydrazine salts.

Example 1

Hydrazine dihydrochloride (1.05 gm. or 0.01 mole) is contacted with 0.76 gm. (0.02 mole) of sodium borohydride and 50 ml. of dioxan at room temperature and atmospheric pressure. The resulting mixture is stirred until hydrogen evolution ceases. At the end of this time the solids are removed by filtration and the dioxan is evaporated to permit the recovery of 0.36 gm. (60% yield) of 85% pure hydrazine diborane. Recrystallization of this product from THF (tetrahydrofuran) gives a 100% pure material as determined by nitrogen analysis (nitrogen found: 47%, calculated: 47%).

Example 2

Hydrazine dihydrochloride (15.8 gm. or 0.15 mole) is contacted with 11.4 gm. (0.30 mole) of sodium borohydride and 250 ml. of THF at 0° C. and atmospheric pressure until the evolution of hydrogen ceases (about 11 days). The solids are then filtered from the reaction mixture and the THF is evaporated to permit the recovery of 4.2 gm. of 90% pure hydrazine diborane. The filtered solids are placed in 200 ml. of THF and stirred vigorously at room temperature. Hydrogen is again evolved and when the evolution of that gas ceases, the reaction mixture is again filtered and the filtrate evaporated. This further reaction yields an additional 1.8 gm. of 90% pure hydrazine diborane (total yield is 67%). Recrystallization of the product from THF results in pure material having a melting point above 260° C. The hydrazine diborane is characterized as follows:

|  | Found | | Calculated |
|---|---|---|---|
|  | 1 | 2 |  |
| Boron, Percent | 36.10 | 36.10 | 36.23 |
| Nitrogen, Percent | 46.40 | 46.45 | 46.90 |
| Hydrogen, Percent | 16.28 | 17.04 | 16.87 |
| Molecular Wt | ca. 60 |  | 59.7 |

It is noted that in the Crawford Strand Burner the hydrazine diborane exhibits a burning rate of approximately 0.5″/sec. when used as a monopropellant.

Example 3

Example 2 is repeated using 0.3 mole of potassium borohydride in place of sodium borohydride.

Example 4

Example 2 is repeated using 0.15 mole of calcium borohydride in place of sodium borohydride.

Example 5

Hydrazine dihydrobromide (2.91 grams) is contacted with 1.14 grams of sodium borohydride and 25 ml. THF at ambient temperature and atmospheric pressure for 24 hours. The solids are then filtered from the reaction product and the THF is evaporated to recover the hydrazine diborane product. The yield which is 0.9 gram is 47% of the theoretical yield; this is about 4 to 5 times the yield obtained with hydrazine dihydrochloride under the same conditions. For this reason hydrazine dihydrobromide is one of the preferred reactants. One disadvantage to employing this reactant is that it has a relatively short shelf life and therefore must be used within a reasonable time after its preparation.

Example 6

Another preferred hydrazine reactant is hydrazine sulfate ($N_2H_4 \cdot H_2SO_4$) because this substance produces high yields of hydrazine diborane when reacted with alkali metal borohydride. Moreover, it is more stable than hydrazine dihydrobromide and available in large quantities. When hydrazine sulfate is reacted with sodium borohydride on an increased scale, it is noted that the yield is significantly reduced. However, it is not reduced to the same extent as it is in the case of hydrazine dihydrochloride.

Example 2 is repeated, except that the temperature is ambient, on three different scales using both hydrazine dihydrochloride and hydrazine sulfate as the reactants. The results are set forth in Table I:

TABLE I.—EFFECT OF AMOUNT OF REACTANTS ON YIELD

| Scale[1] | Hydrazine Compound | Weight Percent of Reactants, grams | | Time of Reaction | Yield, Percent Theory |
|---|---|---|---|---|---|
|  |  | Hydrazine Cpd. | Borohydride |  |  |
| 0.9 | $N_2H_4 \cdot 2HCl$ | 1.58 | 1.14 | 24 Hrs | 10 |
| 0.9 | $N_2H_4 \cdot H_2SO_4$ | 1.95 | 1.14 | 24 Hrs | 40 |
| 9.0 | $N_2H_4 \cdot 2HCl$ | 15.8 | 11.4 | 6 Days | 30 |
| 9.0 | $N_2H_4 \cdot H_2SO_4$ | 19.5 | 11.4 | 5 Days | 92 |
| 90.0 | $N_2H_4 \cdot 2HCl$ | 153 | 114 | 5 Days | <5 |
| 90.0 | $N_2H_4 \cdot H_2SO_4$ | 195 | 114 | do | 60 |

[1] Theoretical yield of $N_2H_4 \cdot B_2H_6$ in gms.

*Example 7*

Example 2 is repeated using 0.15 mole (18.6 grams) of hydrazine diformate and 11.4 grams of sodium borohydride as the reactants.

It is not intended to restrict the present invention to the foregoing examples, but rather it should only be limited by the appended claims in which it is intended to claim all the novelty inherent in the invention. For instance with respect to utility, the diborane can be used for many purposes other than those mentioned above. To be specific, it can be used as a detonator or it can be combusted to make hydrogen and boron nitride, both of which have numerous uses in the chemical field.

What is claimed is:

1. Process for preparing hydrazine diborane which comprises reacting reactants consisting of a borohydride salt selected from the group consisting of alkali metal, alkaline earth metal, aluminum, and quaternary ammonium borohydride salts and a hydrazine salt containing a diprotic hydrazinium ion ($N_2H_6^{++}$) in an inert liquid diluent with evolution of hydrogen to form hydrazine diborane having the empirical formula $B_2N_2H_{10}$ and a solid by-product salt from the cation of the borohydride salt and from the anion of the hydrazine salt, separating unreacted solid reactant salt and said by-product salt from a resulting solution of hydrazine diborane in the diluent, and recovering the hydrazine diborane from the diluent.

2. Process for preparing hydrazine diborane having the empirical formula $B_2N_2H_{10}$ which comprises reacting reactants consisting of a borohydride salt selected from the group consisting of alkali metal, alkaline earth metal, aluminum, and quaternary ammonium borohydride salts and a hydrazine salt containing the diprotic hydrazinium ion ($N_2H_6^{++}$) in the presence of an inert liquid diluent with evolution of hydrogen to form the hydrazine diborane, said borohydride salt and said hydrazine salt being mixed as solids in the diluent and said hydrazine diborane as it is formed being dissolved in the diluent, removing unreacted salt and by-product salt solids from the resulting diluent solution of the hydrazine diborane, and recovering the hydrazine diborane by separation from the diluent.

3. Process for preparing hydrazine diborane having the empirical formula $B_2N_2H_{10}$, which comprises reacting reactants consisting of an alkali metal borohydride and a hydrazine salt of an inorganic acid, said hydrazine salt containing a diprotic hydrazinium ion ($N_2H_6^{++}$), in the presence of a cyclic ether as an inert liquid diluent at a temperature between about −80° C. and 260° C. with evolution of hydrogen for a sufficient time to form hydrazine diborane which dissolves in the liquid diluent while unreacted portions of said alkali metal borohydride and of said hydrazine salt remain as solids with solid salt by-product of the reaction in the diluent, said salt by-product being formed from the cation of the borohydrides and from the anion of the hydrazine salt, removing said solids from resulting diluent solution of the hydrazine diborane, and recovering the hydrazine diborane by distilling the diluent from the hydrazine diborane product freed of said solids.

4. Process according to claim 3 in which the hydrazine salt is hydrazine sulfate.

5. Process according to claim 3 in which the hydrazine salt is hydrazine dihydrobromide.

6. Process according to claim 3 in which the hydrazine salt is hydrazine dihydrochloride.

7. Process for preparing hydrazine diborane having the empirical formula $B_2N_2H_{10}$, which comprises reacting reactants consisting of sodium borohydride and hydrazine sulfate in the presence of liquid tetrahydrofuran as inert liquid diluent at temperatures of about 0° to 45° C. with evolution of hydrogen to form the hydrazine diborane and sodium sulfate, filtering the resulting reaction mixture to recover a filtrate of the hydrazine diborane dissolved in the liquid diluent separated from unreacted solid salts and sodium sulfate, and distilling the diluent from the hydrazine diborane in the filtrate.

References Cited

UNITED STATES PATENTS 2,545,633   3/1951   Schlesinger _____ 23—14

OTHER REFERENCES

Schechter et al.: "Brown Hydrides and Related Compounds," 2nd edition, pages 6, 13, 44, 49, 50, 69, 70, 78, May 1954, declassified Jan. 6, 1958.

Schlesinger: J. Amer. Chem. Soc. 75, pp. 186–188, Jan. 5, 1953.

OSCAR R. VERTIZ, *Primary Examiner.*

WILLIAM G. WILES, ROGER L. CAMPBELL, LEON D. ROSDOL, *Examiners.*

C. D. QUARFORTH, R. D. MORRIS, MILTON WEISSMAN, *Assistant Examiners.*